US010523468B2

(12) United States Patent
Zou (10) Patent No.: US 10,523,468 B2
(45) Date of Patent: Dec. 31, 2019

(54) TRAFFIC FORWARDING

(71) Applicant: HEWLETT PACKARD ENTERPRISE DEVELOPMENT LP, Houston, TX (US)

(72) Inventor: Wenyu Zou, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/522,902

(22) PCT Filed: Nov. 2, 2015

(86) PCT No.: PCT/CN2015/093564
§ 371 (c)(1),
(2) Date: Apr. 28, 2017

(87) PCT Pub. No.: WO2016/066145
PCT Pub. Date: May 6, 2016

(65) Prior Publication Data
US 2017/0331643 A1    Nov. 16, 2017

(30) Foreign Application Priority Data

Oct. 31, 2014 (CN) .......................... 2014 1 0604368

(51) Int. Cl.
*H04L 12/64* (2006.01)
*H04L 12/707* (2013.01)
*H04L 12/703* (2013.01)

(52) U.S. Cl.
CPC .......... *H04L 12/6418* (2013.01); *H04L 45/22* (2013.01); *H04L 45/28* (2013.01); *H04L 2012/6416* (2013.01)

(58) Field of Classification Search
None
See application file for complete search history.

(56) References Cited

U.S. PATENT DOCUMENTS

2012/0320739 A1* 12/2012 Kamath .................. H04L 45/66
370/225
2013/0003738 A1* 1/2013 Koganti ................ H04L 61/103
370/392
(Continued)

FOREIGN PATENT DOCUMENTS

CN       101814997 A    8/2010
CN       101827025      9/2010
(Continued)

OTHER PUBLICATIONS

Eastlake et al., "Transparent Interconnection of Lots of Links (TRILL) Use of IS-IS", Internet Engineering Task Force (IETF), Request for Comments: 7176, May 2014, 45 pages.
(Continued)

*Primary Examiner* — Donald L Mills
(74) *Attorney, Agent, or Firm* — Park, Vaughan, Fleming & Dowler LLP (57) ABSTRACT

An RB device creates a primary multicast tree and a corresponding backup multicast tree, and determines whether the primary multicast tree for forwarding traffic fails or not, according to a received first LSP packet; when the primary multicast tree fails, the RB device forwards the traffic using the backup multicast tree.

9 Claims, 4 Drawing Sheets

(56) References Cited

U.S. PATENT DOCUMENTS

| | | | |
|---|---|---|---|
| 2013/0088953 A1* | 4/2013 | Zhao | H04L 45/22 370/218 |
| 2013/0089100 A1 | 4/2013 | Zhao et al. | |
| 2013/0148663 A1* | 6/2013 | Xiong | H04L 45/745 370/392 |
| 2013/0336191 A1* | 12/2013 | Zhao | H04L 12/1863 370/312 |
| 2014/0280711 A1* | 9/2014 | Asati | H04L 45/28 709/217 |
| 2015/0043383 A1* | 2/2015 | Farkas | H04L 45/22 370/254 |
| 2015/0055650 A1* | 2/2015 | Bhat | H04L 12/185 370/390 |
| 2015/0055652 A1* | 2/2015 | Yong | H04L 12/184 370/390 |
| 2015/0085706 A1* | 3/2015 | Ginsberg | H04L 45/48 370/256 |
| 2015/0103844 A1* | 4/2015 | Zhao | H04L 45/42 370/410 |
| 2015/0138957 A1* | 5/2015 | Kaushik | H04L 45/28 370/228 |
| 2017/0093612 A1* | 3/2017 | Singh | H04L 12/18 |

FOREIGN PATENT DOCUMENTS

| | | |
|---|---|---|
| CN | 102316016 | 1/2012 |
| CN | 102726000 | 10/2012 |
| CN | 103023665 A | 4/2013 |
| CN | 103178976 A | 6/2013 |
| WO | WO2012109941 A1 | 8/2012 |

OTHER PUBLICATIONS

International Search Report and Written Opinion dated Jan. 26, 2016, PCT Patent Application No. PCT/CN2015/093564 dated Nov. 2, 2015, State Intellectual Property Office of the P R China 11 pages.

Perlman et al., "Routing Bridges (RBridges): Base Protocol Specification", Internet Engineering Task Force, Request for Comments: 6325, Jul. 2011, 99 pages.

\* cited by examiner

TRAFFIC FORWARDING

BACKGROUND

TRILL (Transparent Interconnection of Lots of Links) is an L2 network standard recommended by the IETF. A TRILL network includes Routing Bridge (RB) devices supporting the TRILL protocol, where multi-destination packet (including unknown unicast packet, multicast packet and broadcast packet) in the TRILL network are forwarded by using a multicast tree, and the respective RB devices calculate multicast forwarding entries of the multicast tree, and forward the multi-destination packet according to the multicast forwarding entries. If there is a change in topology in the TRILL network, for example, some link in the network fails, then the failure can be detected by an RB device connected with the failing link, and synchronized to the other RB devices in an LSP (Link State Protocol data unit). The respective RB devices need to update topology information and recalculate the multicast forwarding entries.

DETAILED DESCRIPTION OF THE EMBODIMENTS

Figure 1:
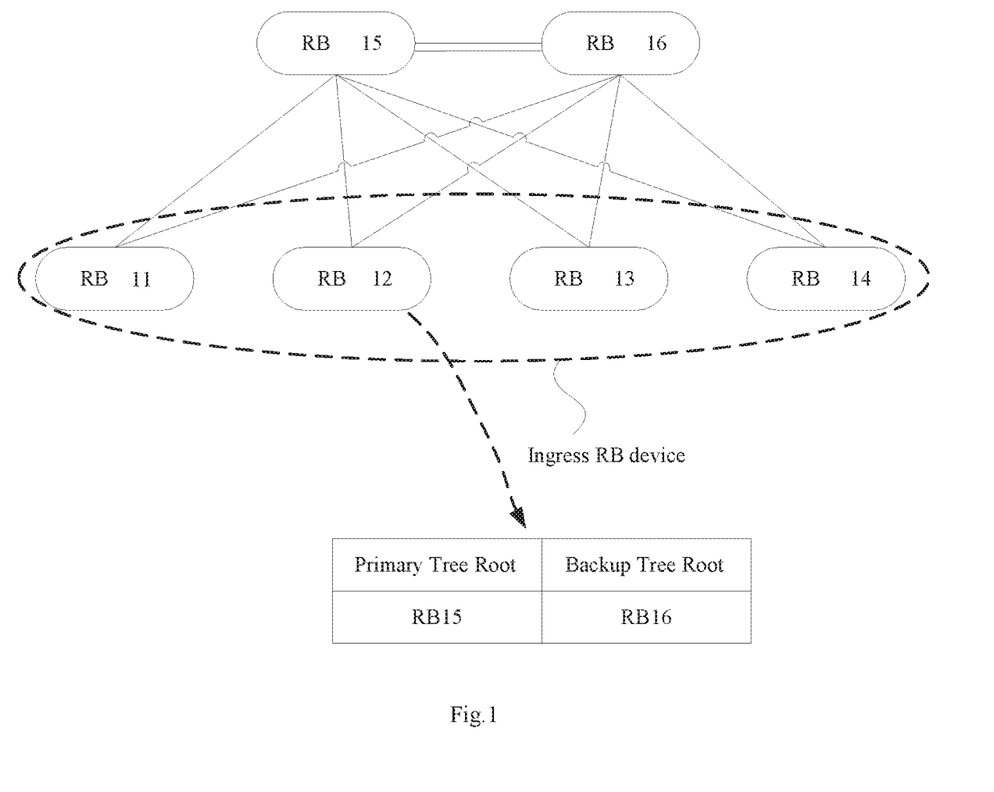
FIG. 1 illustrates an architectural diagram of a TRILL network in an example.

FIG. 1 schematically illustrates the architecture of a TRILL network which can include a plurality of RB devices operating in the TRILL protocol. For example, the TRILL network includes an RB11, an RB12, an RB13, an RB14, an RB15 and an RB16. One of these RB devices in the TRILL network can be selected as a tree root (there may be a plurality of tree roots throughout the TRILL network). The RB devices may calculate multicast tree which includes links from the tree root to any one of the RB devices throughout the network, that is, the RB devices will calculate forwarding entries of the multicast tree corresponding to the tree root. Taking the RB15 as an example, if the RB15 is a tree root, then FIG. 1 illustrates a multicast tree with the RB15 being the tree root (denoted by the thin solid lines), where the multicast tree includes five links between the RB15 and the respective RB11, RB12, RB13, RB14 and RB16, and each of the RB devices will calculate a forwarding entries of the multicast tree.

In the TRILL network, multi-destination packet (including unknown unicast packet, multicast packet and broadcast packet) can be forwarded by the multicast trees calculated above. Since the TRILL network may include a plurality of multicast trees, if a multi-destination packet enters the TRILL network from an ingress RB device, then the ingress RB device will select one of the multicast trees for forwarding the packet. For example, the ingress RB device can select the multicast tree according to a VLAN identifier carried in the packet. The ingress RB device can determine the multicast tree corresponding to the VLAN identifier by referring to an ingress entry (set in an ingress table). The transit RB devices and the egress RB devices in the TRILL network can forward the packet according to the forwarding entries of the multicast tree selected by the ingress RB device.

If the TRILL network topology changes, for example, some link in the network fails, then a multicast tree influenced by the failing link will not be operative and can not forward packets (also called traffic) any more. The traffic may be switched to another multicast tree. If the failing multicast tree is exactly the multicast tree corresponding to the VLAN identifier carried in the packet, then traffic carrying such VLAN identifier will be interrupted. The current disclosure provides a method for FRR (fast Re-Routing) so that the traffic of the VLAN can be switched rapidly to maintain the traffic forwarding service.

Figure 2:
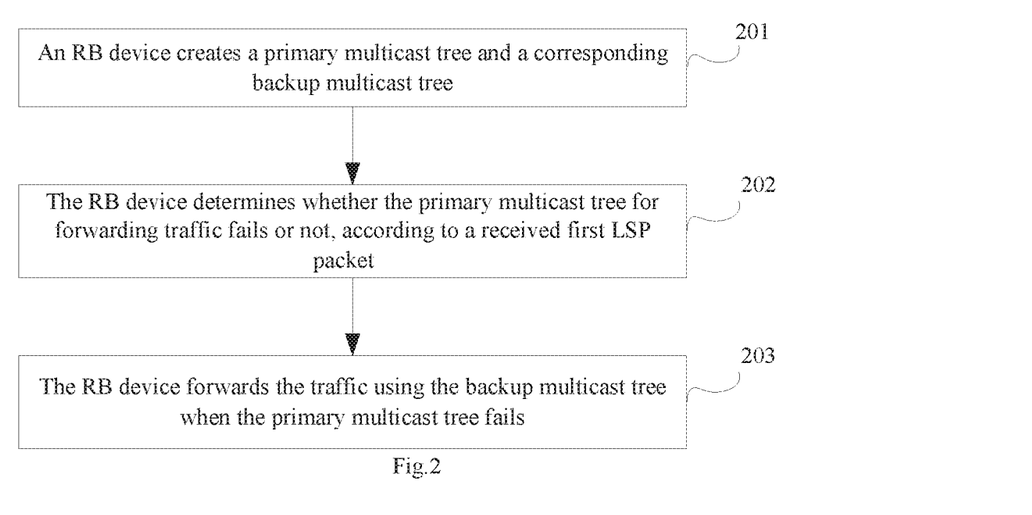
FIG. 2 illustrates a flow chart of a method for forwarding traffic in an example.

FIG. 2 illustrates an example a flow chart of forwarding traffic in multicast FRR according to this disclosure:

In the block 201, an RB device creates a primary multicast tree and a corresponding backup multicast tree, where the primary multicast tree is a multicast tree initially used for traffic forwarding, and the backup multicast tree can be a multicast tree for traffic forwarding instead of the primary multicast tree when the primary multicast tree fails, that is, if the primary multicast tree fails, then traffic forwarded by the primary multicast tree can be switched to the backup multicast tree.

In a TRILL network, each RB device may create a primary multicast tree and a corresponding backup multicast tree. One type of the RB devices in the TRILL network can be responsible for determining tree roots of the primary multicast tree and the corresponding backup multicast tree, for the convenience of subsequent descriptions, this type of RB device can be referred to as an executive RB device. The RB devices other than the executive RB device can be referred to as non-executive RB devices. A non-executive RB device may calculate forwarding entries of the multicast tree according to the tree root determined by the executive RB device, and a particular procedure of creating a multicast tree will be described below in a procedure illustrated in FIG. 3.

After the block 201, the RB devices have created the primary multicast trees and the backup multicast trees, and stored the forwarding entries of the primary multicast trees and backup multicast trees in a forwarding table, where traffic is initially forwarded along the primary multicast trees. In the block 202, the RB device may receive a first LSP packet (the term "first" here is only intended to be distinguished from other later LSP packets for different functions but will not limit this disclosure in any way; and the same will apply to subsequent terms "second", "third", etc.), and can determine that the primary multicast tree for forwarding traffic fails or not, according to the first LSP packet.

The RB device can determine whether there is a link failure, according to a change in link information carried in the first LSP packet. For example, if there is a change in topology in the TRILL network. For example, if some link fails, then an RB device connected with the failing link can detect that the link fails, and the connected RB device may send a first LSP packet carrying information about currently available links. The RB device receiving the first LSP packet can determine link failure information according to a difference between the new and old first LSP packets sent by the same RB. For example, if first LSP packets sent periodically by some RB device are received, where a first LSP packet received includes available links L1, L2 and L3, and a first LSP packet later includes available links L1 and L2, then it can be determined hereby that the link L3 fails. In this way, a change in topology of the TRILL network can be synchronized throughout the TRILL network in the LSP packets, that is, the other RB devices in the network can be notified that the link fails.

Referring to FIG. 1 as well, for example, the ingress RB device RB12 in FIG. 1 determines that the link fails, where the RB12 can receive the first LSP packet sent by the RB device connected with the failing link. Since the multicast trees are calculated by the respective RB devices, the RB device may identify those links included in the multicast trees, and accordingly also determine specific one of the multicast trees has failure due to the failing link. The RB12 receiving the first LSP packet can identify specific one of the links in the network fails and also identify specific one of the multicast trees influenced by the failing link. In block 202, the multicast tree including the failing link may be referred to as the primary multicast tree. The RB 12 may determine that the primary multicast tree including the failing link fails and can not be used for ongoing traffic forwarding any longer.

For example, the RB 12 detects that there is a link failure in the initially calculated primary multicast tree with the RB15 being a tree root. For example, the link connecting the RB15 with the RB14 fails. The RB12 can identify that the link fails, according to the received first LSP packets sent by the RB15 connected with the failing link.

In the block 203, the RB device can acquire the backup multicast tree corresponding to the primary multicast tree failing, and forward the traffic using the backup multicast tree instead of the primary multicast tree.

For example, if the RB12 receives a multicast packet carrying a VLAN ID=20, then the RB 12 forwards the multicast packet using the backup multicast tree corresponding to the primary multicast tree (with the RB15 being a tree root) to forward the multicast packet carrying the VLAN20 upon determining that the primary multicast tree fails. A correspondence relationship between the tree root of the primary multicast tree (the primary tree root) and the tree root of the backup multicast tree (the backup tree root) could be recorded in the RB12, as illustrated in FIG. 1.

If the tree root of the backup multicast tree corresponding to the primary multicast tree is the RB16, then the RB12 will forward the packet using the multicast tree corresponding to the RB16 in this block. Since the RB12 stores the forwarding entries of the backup multicast tree, calculated in advance, the RB12 may have the identifier of the selected backup multicast tree (e.g., the tree root of the backup multicast tree) included in the packet when performing TRILL format encapsulation for the packet (generally, a layer-2 multicast packet). As transit RB devices and the egress RB device have stored the forwarding entries of the backup multicast tree selected by the ingress RB device, the multicast packet may be forwarded along the backup multicast tree according to the forwarding entries.

That is, the ingress RB device of the TRILL network can switch traffic forwarded along the primary multicast tree to a backup multicast tree according to a recorded correspondence relationship between the primary multicast tree and the backup multicast tree when the failure of the primary multicast tree is determined. And the switch operation will be smooth to such transit RB devices and egress RB devices since all of transit RB devices and an egress RB devices store forwarding entries of the backup multicast tree. That means RB device can rapidly and smoothly switch traffic forwarding if there is a change in topology in the TRILL network to thereby enhance the reliability and robust of traffic forwarding service.

Moreover, in another example, if the link failure of the TRILL network affects both the primary multicast tree and the backup multicast tree, then the ingress RB device may not switch the multicast tree but can proceed in another way. For example, the ingress RB device may wait to recalculate the forwarding entries of the multicast tree having the same tree root with the primary multicast tree.

As described above, in this example, the RB devices in the TRILL network store the correspondence relationship between the primary multicast tree and the backup multicast tree, and the forwarding entries of the backup multicast tree, both of which are calculated in advance. A backup multicast tree can be elected and generated as described below.

Figure 3:
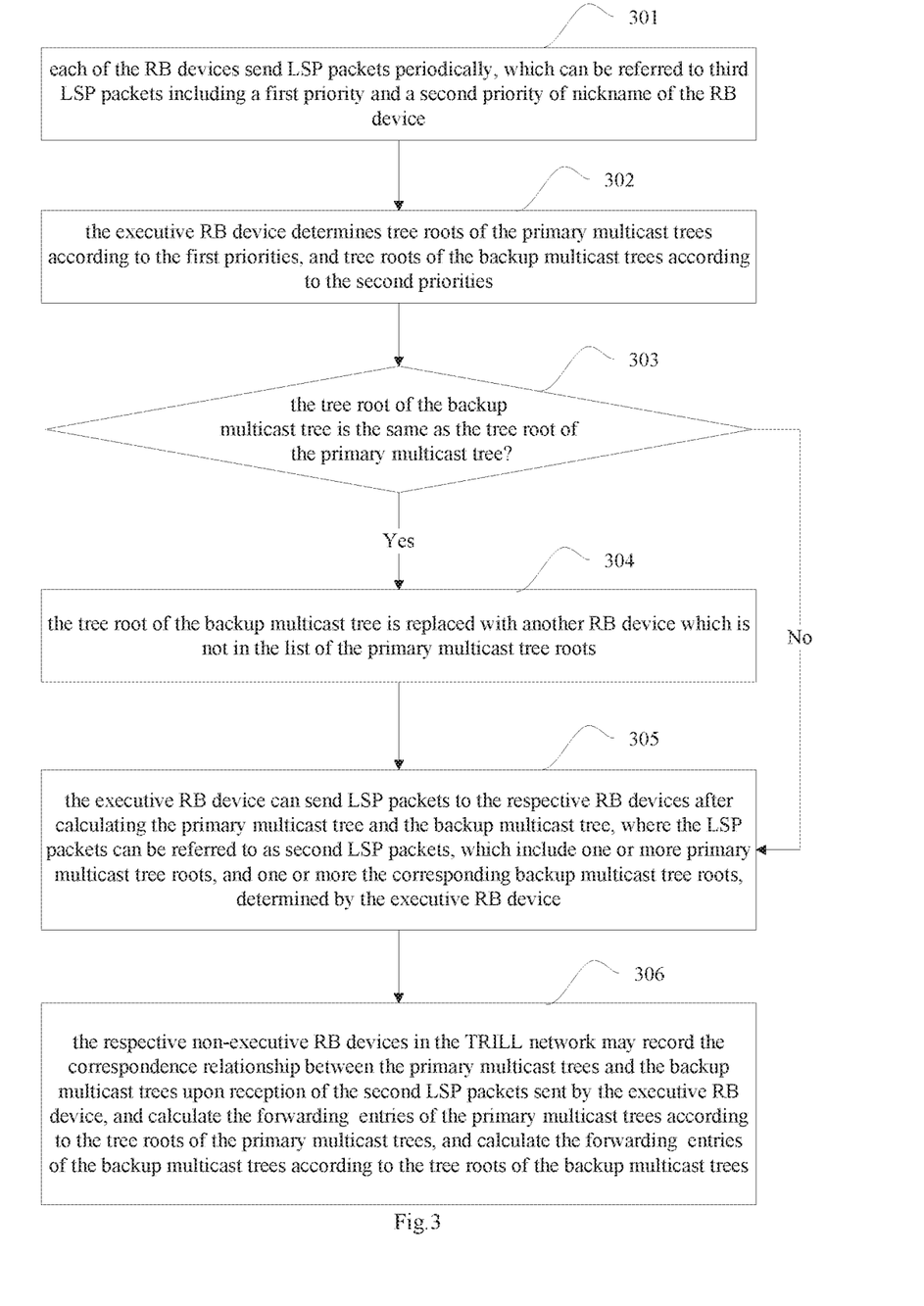
FIG. 3 illustrates a flow chart of another method for forwarding traffic in an example.

FIG. 3 illustrates a procedure of generating a backup multicast tree, where in the block 301, each of the RB devices send LSP packets periodically, which can be referred to third LSP packets including a first priority and a second priority of nickname of the RB device.

A multicast tree in the TRILL network can be elected according to the nicknames of the respective RB devices, where the nicknames can be exchanged by the LSP packets sent periodically, so the respective RB devices can obtain the nicknames of the RB devices throughout the network.

In this example, the RB device may send third LSP packets carrying the first priority and the second priority of the nickname of the RB device. The first priority represents a priority of the RB device being the tree root of a primary multicast tree, and the second priority represents a priority of the RB device being the tree root of a backup multicast tree. In an example, the information about the nickname is carried in a Full Nickname Sub-TLV instead of a Nickname Sub-TLV in a normal LSP packet. The format of the Full Nickname Sub-TLV may substantially follow the Nickname Sub-TLV defined in related standard with a priority field being added to the NICKNAME RECORDS structure.

Figure 4:
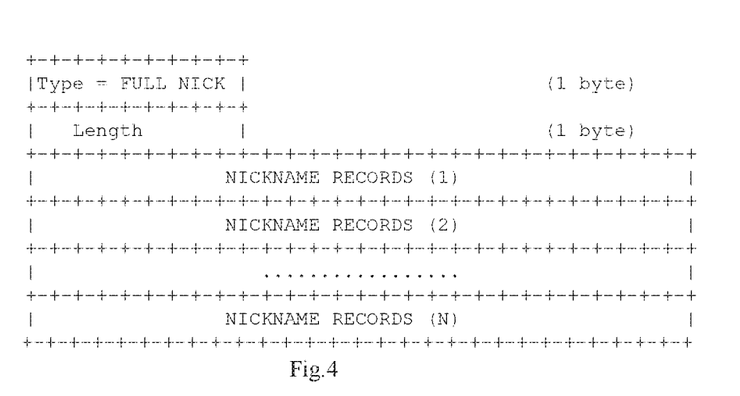
FIG. 4 illustrates a structural diagram of a full nickname sub-TLV in the method for forwarding traffic in an example.
Figure 5:
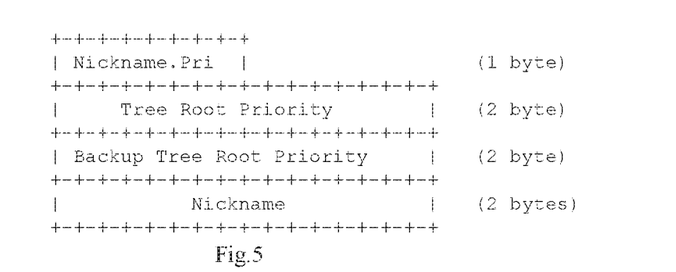
FIG. 5 illustrates a structural diagram of nickname records in the full nickname sub-TLV in the method for forwarding traffic in an example.

For example, FIG. 4 illustrates a structure of the newly added Full Nickname Sub-TLV, and FIG. 5 illustrates a structure of NICKNAME RECORDS in the Sub-TLV, where respective fields in the Full Nickname Sub-TLV will be defined as follows with reference to FIG. 4 and FIG. 5 together:

Type: sub-TLV type value, which has a length of 1 byte, where the name of the Type is set to Full Nick so that the name is distinguished from a type value of the normal Nickname Sub-TLV. For the sake of compatibility and intercommunication, the type value shall be different from the Nickname Sub-TLV, where the Full Nickname Sub-TLV is used for intercommunication with an RB device supporting the present solution, and the existing Nickname Sub-TLV is used for intercommunication with an RB device which does not support this solution, that is, the type value can indicate whether the RB device supports the present solution, so that the corresponding Sub-TLV will be used;

Length: a load length of the sub-TLV, which does not include the Type and Length fields;

Parameter information related to each nickname value is stored in the NICKNAME RECORDS structure (each RB device can support one or more nicknames), including:

Nickname.Pri: the priority to hold the nickname, where the value is the same as the value of the field in the Nickname Sub-TLV;

Tree Root Priority: the priority of the nickname serving as a primary multicast tree root, where the value thereof is the same as the value of the field in the existing Nickname Sub-TLV;

Backup Tree Root Priority: the priority of the nickname serving as a backup multicast tree root, where the value thereof is the same as the value of the Tree root Priority field; and Nickname: the value of the nickname, which is the same as the value of the field in the Nickname Sub-TLV.

The Tree Root Priority in the LSP packet can be referred to as the first priority, and the Backup Tree Root Priority can be referred to as the second priority. Each RB device will receive an LSP packet sent by other RB devices, so each RB device will obtain the first priorities and the second priorities corresponding to the nicknames of the respective RB devices in the TRILL network.

In the block 302, the RB device determines tree roots of the primary multicast trees according to the first priorities, and tree roots of the backup multicast trees according to the second priorities.

For example, the process of the tree roots determination can be performed by the executive RB device, and the RB device having the highest priority can be referred to the executive RB device according to the first priority. In this example the first priority is the tree root priority of the nickname. The executive RB device can determine the tree roots of the primary multicast trees according to the first priorities corresponding to the nicknames of the respective RB devices, and determine tree root of the backup multicast tree corresponding to the primary multicast trees according to the second priority of the nickname.

For example, if the primary multicast tree is determined according to the first priority of the nickname, then the respective nicknames can be sorted in an order of the descending first priorities of the nicknames, where a nickname having a higher priority has a higher first priority, and the number of multicast trees to be calculated in the TRILL network is determined. If the number of primary multicast trees to be calculated in the TRILL network is N (N represents a natural number more than or equal to 1), then first N nicknames in the list of nicknames can be selected as tree roots of the primary multicast trees. A multicast tree can be represented as a tree root, so the executive RB device can determine the multicast tree by determining the tree root.

In another example, the backup multicast tree can be determined according to the second priority of the nickname in the same way as the primary multicast tree, for example, the nicknames can be sorted in an order of the second priorities thereof, and first N nicknames can be selected respectively for the backup multicast trees of the primary multicast trees. For example, the multicast tree ranked firstly in the list of backup multicast trees (i.e., the nickname ranked firstly after the nicknames are sorted according to the second priorities) can be determined as the backup multicast tree according to the primary multicast tree ranked firstly in the list of primary multicast trees.

In the block 303, the RB device can determine whether the tree root of the backup multicast tree is the same as the tree root of the primary multicast tree. For example, the executive RB device can perform the determination. The respective blocks may not be performed in exactly the same order described here, for example, the block 303 may be performed while the block 302 is being performed.

Generally, an RB device serving as a primary multicast tree root may not be a backup multicast tree root at the same time, otherwise, backup mechanism may not work. In this block, if the determination is positive, that is, there is at least the same one of the tree roots of the primary multicast trees as one of the tree roots of the backup multicast trees, then the executive RB device detecting this, for example, determining that the tree root of the backup multicast tree is the same as one of the tree roots of the primary multicast trees can perform the block 304 in which the tree root of the backup multicast tree is replaced with another RB device which is not in the list of the primary multicast tree roots. That is, the executive RB device will reselect an RB device as the tree root of the backup multicast tree so that none of the tree roots in the list of the primary multicast tree roots will be the same as any of the tree roots in the list of tree roots of the backup multicast tree. The specific other replacing RB device can be set flexibly although a detailed description thereof will be omitted here. If there is a negative determination result in this block, then the procedure will proceed to the block 305.

In the block 305, the RB device can send LSP packets to the respective RB devices after calculating the primary multicast tree and the backup multicast tree, where the LSP packets can be referred to as second LSP packets, which include one or more primary multicast tree roots, and one or more the corresponding backup multicast tree roots. For example, the second LSP packets can be sent by the executive RB device, and the executive RB device can carry the primary multicast tree roots and the corresponding backup tree roots determined by the executive RB device in the second LSP packets.

For example, the executive RB device can declare the determined primary multicast trees and backup multicast trees in the second LSP packets so that the other RB devices in the TRILL network calculate the forwarding entries of the multicast trees determined by the executive RB device for subsequent packet forwarding. It shall be noted that the LSP packets sent by a RB device other than the executive RB device (i.e., a non-executive RB device) in the TRILL network include the full nickname sub-TLV to indicate the nickname information; and the second LSP packet sent by the executive RB device includes the Full Nickname Sub-TLV, the Tree Identifiers Sub-TLV, and the Backup Tree Identifiers Sub-TLV to indicate it own nickname information and the primary and backup multicast trees.

Figure 6:
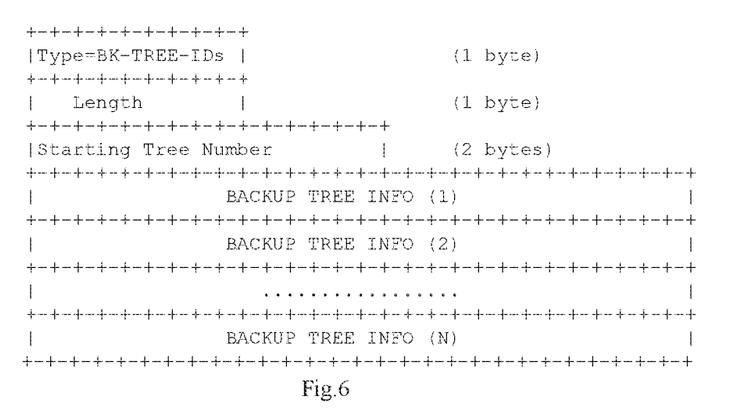
FIG. 6 illustrates a structural diagram of a backup tree identifier sub-TLV in the method for forwarding traffic in an example.
Figure 7:
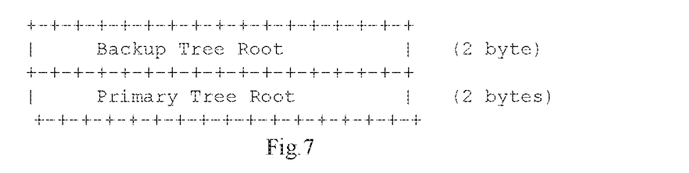
FIG. 7 illustrates a structural diagram of backup tree info in the backup tree identifier sub-TLV in the method for forwarding traffic in an example.

For example, the executive RB device can declare the primary multicast tree to be calculated by the respective RB devices using the Tree Identifiers Sub-TLV (the multicast tree announcement sub-TLV (Type Length Value)) in the second LSP packet (the multicast tree can be represented as the nickname of the tree root), the backup multicast tree and the correspondence relationship between the primary multicast tree and the backup multicast tree can be announced in the Backup Tree Identifiers Sub-TLV. FIG. 6 and FIG. 7 illustrate the structure of the Backup Tree Identifiers Sub-TLV, where FIG. 7 illustrates a structure of Backup Tree Info in the Sub-TLV. Respective fields in the Backup Tree Identifiers Sub-TLV are defined as follows:

Type: a type value of the sub-TLV, which indicates that the sub-TLV represents information about the backup multicast tree;

Length: a load length of the sub-TLV, which does not include the Type and Length fields;

Starting Tree Number: a starting serial number of the backup multicast trees in the local sub-TLV:

BACKUP TREE INFO includes information about the respective backup multicast tree:

Backup Tree Root: the nickname value of the backup multicast tree, which is a backup of the primary multicast tree declared by the Primary Tree Root; and Primary Tree Root: the nickname value of the primary multicast tree, which is a backup of the backup multicast tree declared by the Backup Tree Root.

Moreover, besides distributing the primary multicast tree root and the corresponding backup multicast tree root, the executive RB device may further calculate the forwarding entries respectively according to the primary multicast tree root and the corresponding backup multicast tree root. For example, the executive RB device calculates the forwarding entries of the primary multicast trees according to the primary multicast tree roots, and calculates the forwarding entries of the backup multicast trees according to the backup multicast tree roots, and records the correspondence relationship between the primary multicast trees and the backup multicast trees.

In the block 306, the respective RB devices (for example, the non-executive RB device) in the TRILL network may record the correspondence relationship between the primary multicast trees and the backup multicast trees upon reception of the second LSP packets sent by the executive RB device, and calculate the forwarding entries of the primary multicast trees according to the tree roots of the primary multicast trees, and calculate the forwarding entries of the backup multicast trees according to the tree roots of the backup multicast trees.

For example, in FIG. 1, the primary multicast tree rooted at RB15 is represented as the thin solid lines; and the backup multicast tree corresponding to the primary multicast tree rooted RB16 is represented as the thick solid lines. The respective RB devices in the network store the correspondence relationship between the two multicast trees, and calculate the forwarding entries of the two respective multicast trees. For example, in the block 203, if the primary multicast tree (rooted at RB15) fails, then the ingress RB device will forward the packet using the corresponding backup multicast tree (rooted at RB16).

The forwarding entries of the backup multicast tree can be calculated using a link different from the primary multicast tree as much as possible, that is, the primary multicast tree and the backup multicast tree include different links; and the more independent the links used by the two multicast trees are, the obvious the backup function is. This disclosure will not be limited to any particular link selection algorithm, for example, the cost of the link of the primary multicast tree can be set the maximum value (−1), and then the forwarding entries of the backup multicast tree can be calculated.

In the procedure illustrated in FIG. 3, the respective RB devices in the TRILL network can obtain the forwarding entries of the primary multicast tree and the backup multicast tree, and can use them to switch the multicast tree if there is a link failure. For example, in the process of multicast FRR in the TRILL network illustrated in FIG. 2, if the primary multicast tree fails, the traffic forwarded by the primary multicast tree can be switched to the backup multicast tree, and the traffic can be forwarded according to the forwarding entries of the backup multicast tree.

Moreover if the ingress RB device switches the traffic to the backup multicast tree, then the respective RB devices can calculate the forwarding entries of the primary multicast tree RB15 immediately, but at this time may not calculate the forwarding entries of the backup multicast tree RB6, when the forwarding entries of the primary temporarily RB15 to be updated (a fixed interval of time controlled by a timer), the respective RB devices calculate the forwarding entries of the backup multicast tree RB16 after the traffic is switched back to primary multicast tree RB15. Both the wait interval of time for the traffic to be forwarded using the primary multicast tree again and calculating the forwarding entry of the backup multicast tree, can be delayed by the timer, and the intervals can be configured manually, and timed by the controller to thereby ensure that all the RB device of the TRILL network calculate the forwarding tables of the relevant multicast tree.

Figure 8:
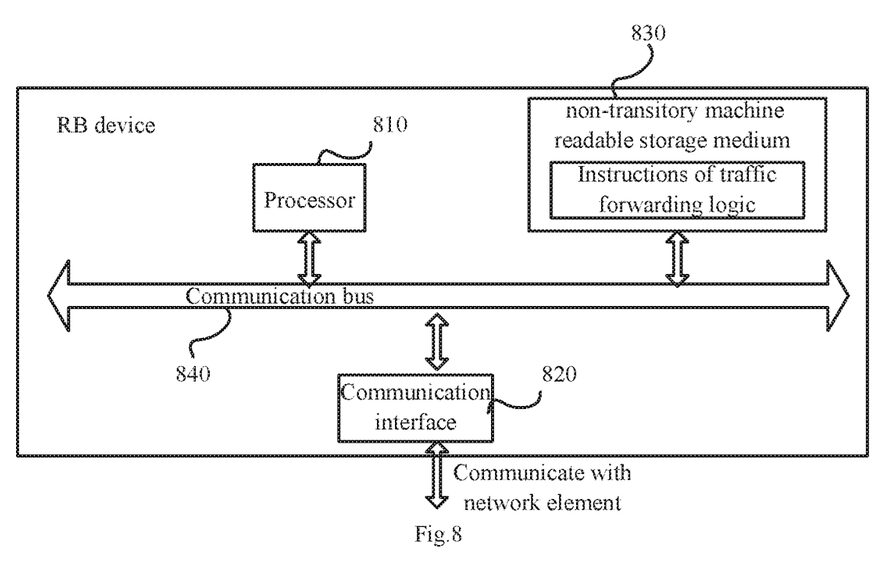
FIG. 8 illustrates a structural diagram of an RB device in an example.

Further to the method above for multicast FRR in a TRILL network, this disclosure further provides an RB device for performing the method. As illustrated in FIG. 8, the RB device can include a processor 810, a communication interface 820, a non-transitory machine readable storage medium 830, and a bus 840, where the processor 810, the communication interface 820, and the non-transitory machine readable storage medium 830 communicate with each other through the bus 840; the communication interface 820 is configured to communicate with a network element, e.g., another RB device; and the processor 810 is configured to perform instructions of traffic forwarding logic stored in the non-transitory machine readable storage medium 830 to perform the method for forwarding traffic according to the respective embodiments above to thereby perform multicast FRR in the TRILL network, e.g., the procedure as illustrated in FIG. 2.

Moreover if the functions above of the RB device are embodied in the form of software functional elements and sold or used as a separate product, then the product can be stored in a computer readable storage medium. Based upon such understanding, the technical solution of the disclosure in essence or the part thereof contributing to the prior art or a part of the technical solution can be embodied in the form of a software product stored in a storage medium and including several instructions to cause a computer device (e.g., a personal computer, a server, a network device, etc.) to perform all or a part of the steps in the method according to the respective embodiments of the disclosure. The storage medium above can include a U-disk, a mobile hard disk, a Read-Only Memory (ROM), a Random Access Memory (RAM), a magnetic disk, an optical disk or various other medium in which program codes can be stored.

The foregoing disclosure is merely illustrative of preferred embodiments of the disclosure but not intended to limit the disclosure, and any modifications, equivalent substitutions, adaptations, thereof made without departing from the spirit and scope of the disclosure shall be encompassed in the claimed scope of the appended claims.

The invention claimed is:

1. A method for forwarding traffic in a Transparent Interconnection of Lots of Links (TRILL) network, the method comprising:

receiving, by a first routing bridge (RB) device within the TRILL network, a first Link State Protocol data (LSP) packet from an executive RB device, the first LSP packet comprising a primary multicast tree identifier and a backup multicast tree identifier;

calculating, by the first RB device, a primary multicast tree based on the primary multicast tree identifier and a backup multicast tree based on the backup multicast tree identifier;

recording, by the first RB device, a correspondence relationship between the primary multicast tree and the backup multicast tree;

detecting, by the first RB device, that a link within the primary multicast tree fails based on a previously received second LSP packet and a newly received second LSP packet originated from a second RB device coupled to the failed link;

identifying, by the first RB device, the backup multicast tree based on the recorded correspondence relationship between the primary multicast tree and the backup multicast tree; and forwarding, by the first RB device, the traffic using the identified backup multicast tree.

2. The method according to claim 1, the method further comprising:

creating, by the executive RB device, the primary multicast tree and the corresponding backup multicast tree, comprising:

receiving, by the executive RB device, a plurality of third LSP packets from a plurality of RB devices in the TRILL network, each third LSP packet comprising a first priority corresponding to a nickname of a respective RB device and a second priority corresponding to a nickname of the respective RB device;

determining, by the executive RB device, roots of one or more primary multicast trees according to the first priorities of the plurality of RB devices, each first priority representing a priority for the respective RB device to serve as a root of a primary multicast tree of the one or more primary multicast trees, determining, by the executive RB device, roots of one or more backup multicast trees corresponding to roots of the one or more primary multicast trees according to the second priorities of the plurality of RB devices, each second priority representing a priority for the respective RB device to serve as a root of a backup multicast tree of the one or more backup multicast trees; and selecting, by the executive RB device, the primary multicast tree from the determined one or more primary multicast trees and the backup multicast tree from the determined one or more secondary multicast trees.

3. The method according to claim 1, wherein:

the process of calculating the primary multicast tree and the corresponding backup multicast tree comprises:

calculating, by the first RB device, the forwarding entries of the primary multicast tree according to the the primary multicast tree identifier included in the first LSP packet, wherein the primary multicast tree identifier identifies a root of the primary multicast tree; and calculating, by the first RB device, the forwarding entries of the backup multicast tree according to the the backup multicast tree identifier included in the first LSP packet, wherein the backup multicast tree identifier identifies a root of the backup multicast tree.

4. The method according to claim 2, wherein selecting the primary multicast tree and the backup multicast tree comprises:

selecting, by the executive RB device, the first root RB device as the root for the primary multicast tree and the second root RB device as the root for the backup multicast root, wherein the second root RB device is selected to be another RB device other than the first root RB device.

5. The method according to claim 1, wherein forwarding, by the first RB device, the traffic using the identified backup multicast tree comprises:

switching, by the first RB device, the traffic to the identified backup multicast tree corresponding to the primary multicast tree with failure, according to the recorded correspondence relationship between the primary multicast tree and the backup multicast tree, wherein the first RB device is an ingress RB device.

6. A routing bridge (RB) device in a Transparent Interconnection of Lots of Links (TRILL) network, comprising a processor and a non-transitory machine readable storage medium storing machine readable instructions which are executable by the processor to:

receive a first Link State Protocol data (LSP) packet from an executive RB device, the first LSP packet comprising a primary multicast tree identifier and a backup multicast tree identifier;

calculate a primary multicast tree based on the primary multicast tree identifier and a backup multicast tree based on the backup multicast tree identifier;

record a correspondence relationship between the primary multicast tree and the backup multicast tree;

detect that a link within the primary multicast tree fails based on a previously received second LSP packet and a newly received second LSP packet and originated from a second RB device coupled to the failed link;

identify the backup multicast tree based on the recorded correspondence relationship between the primary multicast tree and the backup multicast tree; and forward the traffic using the identified backup multicast tree.

7. The RB device according to claim 6, wherein while calculating the primary multicast tree and the corresponding backup multicast tree, the instructions further cause the processor to:

calculate the one or more forwarding entries of the primary multicast tree according to the primary multicast tree identifier included in the first LSP packet, wherein the primary multicast tree identifier identifies a root of the primary multicast tree; and calculate the one or more forwarding entries of the backup multicast tree according to the backup multicast tree identifier included in the first LSP packet, wherein the backup multicast tree identifier identifies a root of the backup multicast tree.

8. The RB device according to claim 6, wherein the instructions further cause the processor to:

distribute a third LSP packet in the TRILL network before creating the primary multicast tree and the corresponding backup multicast tree, wherein the third LSP packet comprises a first priority and a second priority corresponding to a nickname of the RB device, the first priority represents a priority of the RB device being a root of the primary multicast tree, and the second priority represents a priority of the RB device being a root of the backup multicast tree.

9. The RB device according to claim 6, wherein the RB device is an ingress RB device and, for forwarding the traffic using the identified backup multicast tree, the instructions further cause the processor to:

switch the traffic to the identified backup multicast tree corresponding to the primary multicast tree with failure, according to the recorded correspondence relationship between the primary multicast tree and the backup multicast tree.

\* \* \* \* \*